(12) United States Patent
Luchner et al.

(10) Patent No.: US 6,431,759 B1
(45) Date of Patent: Aug. 13, 2002

(54) SPLIT BEARING ARRANGEMENT AND METHOD OF MAKING SAME

(75) Inventors: Clemens Luchner, Baldham (DE); Karl Mayr, Behamberg (AT); Rudolf Wimmer, Haidershofen (AT); Franz Malischew, Steyr (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/674,286

(22) PCT Filed: Apr. 12, 1999

(86) PCT No.: PCT/EP99/02443

§ 371 (c)(1),
(2), (4) Date: Dec. 29, 2000

(87) PCT Pub. No.: WO99/56028

PCT Pub. Date: Nov. 4, 1999

(30) Foreign Application Priority Data

Apr. 29, 1998 (DE) ......................................... 198 19 081

(51) Int. Cl.[7] .............................................. F16C 9/02
(52) U.S. Cl. .......................................... 384/434; 29/898
(58) Field of Search ................................. 384/294, 429, 384/430, 432, 433, 434; 29/898.07, 898.09, 848; 74/579 R; 123/195 R

(56) References Cited

U.S. PATENT DOCUMENTS

| | | | | |
|---|---|---|---|---|
| 3,046,953 A | * | 7/1962 | Dolza | 123/195 R |
| 3,411,378 A | * | 11/1968 | Borgeaud | 74/579 R |
| 3,464,746 A | | 9/1969 | Weber | |
| 3,520,045 A | * | 7/1970 | Kuhn | 29/898.07 |
| 4,037,888 A | * | 7/1977 | Mirjanic | 384/434 |
| 4,189,193 A | * | 2/1980 | Schumacher | 384/434 |
| 5,722,036 A | * | 2/1998 | Shikata et al. | 74/579 R |

FOREIGN PATENT DOCUMENTS

| | | |
|---|---|---|
| DE | 68 12 460 | 4/1969 |
| DE | 1 295 276 | 1/1970 |
| DE | 1 750 668 | 4/1971 |
| DE | 25 39 334 | 4/1976 |
| DE | 26 44 815 | 4/1977 |
| DE | 43 02 303 | 8/1994 |
| DE | 195 35 497 | 3/1997 |
| DE | 196 45 691 | 5/1998 |
| EP | 0 773 376 | 5/1997 |
| EP | 0 882 901 | 12/1998 |
| FR | 1 319 736 | 1/1963 |
| FR | 2 327 440 | 5/1977 |

OTHER PUBLICATIONS

Krist, "Abtragen ist heute ein rationelles Fertigungsverfahren", Technische Rundschau 16/86, pp. 20–27.
Schaede et al., "Entwicklung Elektrisch–thermischer Abtragverfahren in Deutschland", Werkstatt und Betrieb 124 (1991) pp. 379–383.

* cited by examiner

Primary Examiner—le;.5qThomas R. Hannon
(74) Attorney, Agent, or Firm—Crowell & Moring LLP

(57) ABSTRACT

A split bearing arrangement in a machine housing, particularly a crankshaft journal bearing for piston machines. The split bearing arrangement including a bearing block and a bearing cover that are made of materials of different hardnesses. In order to provide a material anchoring between the bearing cover and the bearing block that can be subjected to high loads and is cost-effective to produce, the bearing arrangement provides the bearing cover, which is made of an iron material, with cutting-edge like projections protruding above its clamping faces and, furthermore, provides grooves in the corresponding clamping faces of the bearing cover and the bearing block. These grooves in an initial mounting of the bearing cover with the required force serve to receive the material of the bearing block that is displaced in the pressing-in process when the projections are pressed into the opposite clamping faces of the bearing block, which is made of a light metal.

27 Claims, 1 Drawing Sheet

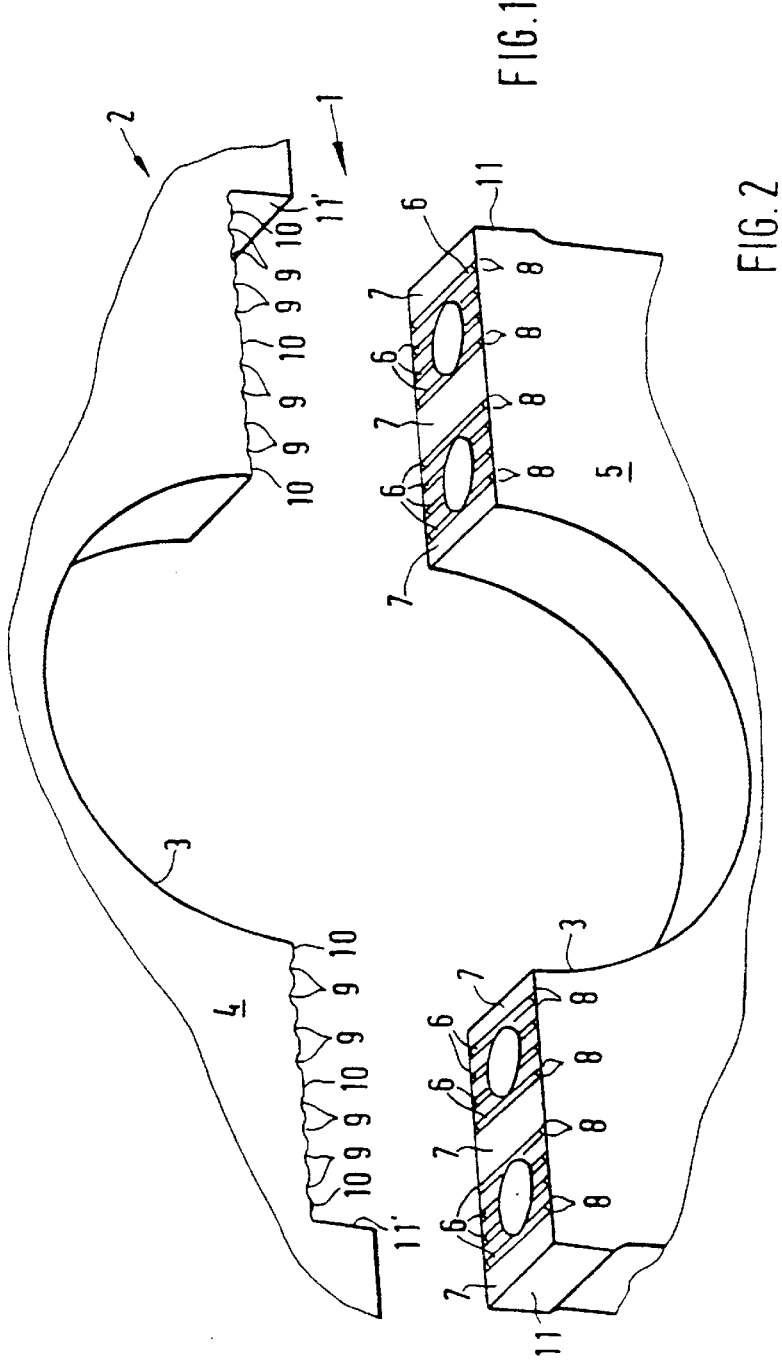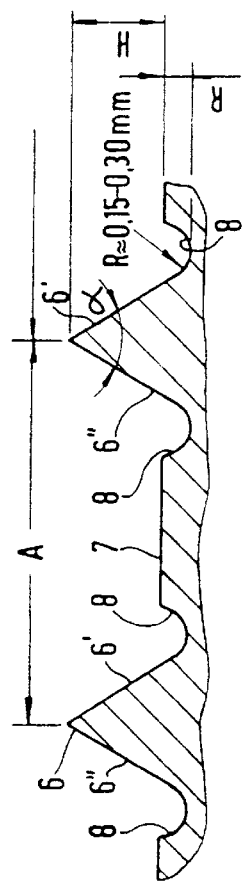

SPLIT BEARING ARRANGEMENT AND METHOD OF MAKING SAME

BACKGROUND AND SUMMARY OF THE INVENTION

The invention, relates to a split bearing arrangement in a housing, particularly a crankshaft journal bearing for piston machines, as disclosed in DE-A 195 35 497.

In a known bearing arrangement, the projections provided on the bearing cover in the area of its clamping face are produced by rough mechanical finish machining of the clamping face. Preferred is a surface roughness that is produced parallel to the bearing center axis by linear milling of the dividing surface or clamping face, whose sharp-edged tips dig into the corresponding opposite clamping face of the bearing block when the journal bearing is clamped together.

A bearing cover with projections in the clamping face manufactured in this manner by no means ensures the form-fit engagement provided by a clamping face that is produced by fracture separation, so that the bearing cover must be additionally secured against transverse loads.

Thus, the object of the invention is to define a bearing arrangement with improved material anchoring.

The material anchoring provided by the invention has the advantage in a split bearing arrangement that the clampably arranged bearing cover can absorb high transverse loads, which is particularly advantageous, for example, in a V-engine.

BRIEF DESCRIPTION OF THE DRAWINGS

The invention will now be described in greater detail, by way of example, with reference to the drawings in which:

FIG. 1 is a perspective view of a bearing cover that is shown spaced at a distance from a bearing block, and FIG. 2 is a detail of the projections shown in cross section.

DETAILED DESCRIPTION OF THE DRAWINGS

A split bearing arrangement 1 in a machine housing 2 of a piston machine (not depicted), particularly for a crankshaft journal bearing 3, comprises a bearing block 4 and a bearing cover 5 made of materials of different hardnesses. The bearing cover 5, which is clampably arranged relative to the bearing block 4, interacts with bearing block 4 in form-fit manner via projections 6 so as to be secure against transverse loads.

To achieve a material anchoring that can be subjected to high loads in the split bearing arrangement 1, particularly a crankshaft journal bearing 3, the bearing cover 5, which is made of an iron material, is provided with cutting-edge like projections 6 protruding above its clamping face 7. Furthermore, grooves 8, 9 are provided in the corresponding clamping faces 7, 10 of bearing cover 5 and bearing block 4. In an initial mounting of the bearing cover 5 with the required force, these grooves serve to receive the material of bearing block 4 that is being displaced in the pressing-in process when the projections 6 are pressed into the opposite clamping faces 10 of the bearing block 4, which is made of a light metal.

The bearing arrangement 1 comprises a bearing cover 5 made of gray cast iron. The projections 6 have an edge angle α of approximately 50°–110° and, furthermore, an edge height "H" above the clamping face 7 of the bearing cover 5 ranging between 0.25 mm–1.5 mm. Rounded grooves 8 with radii R=0.15 mm–0.30 mm, which are cut into the clamping face 7 with a corresponding radius size R, adjoin the edge flanks 6', 6". The adjacent grooves 8 serve to receive the material that is being displaced as the projections are pressed into the bearing block 4. The projections 6 on the bearing cover 5 are selected as straight edges that are spaced apart at a distance "A" of between 2 mm–5 mm.

For the projections 6 in clamping face 7 of bearing cover 5 shown in FIG. 1, a profile of projections 6 as shown in FIG. 2 has proven to be suitable for a bearing diameter range of 40 mm–60 mm, with a selected edge angle of α=60°, an edge height of H=0.75 mm, and a radius of the rounded groove 8 of 0.25 mm–0.3 mm. Furthermore, the edge distance between projections 6 can be selected to be the same or different.

The procedure according to the invention advantageously provides a secure material anchoring in the initial mounting of bearing cover 5 on bearing block 4 in that projections 6 are pressed into corresponding indentations (not depicted), which in any future assembly or disassembly will serve to fix the bearing cover 5 on the bearing block 4 in its exact position.

To achieve an exact allocation of the bearing cover 5 relative to bearing block 4, it is furthermore proposed that as the projections 6 are pressed into the opposite clamping face 10 of bearing block 4 made of an aluminum alloy, the bearing cover 5 be guided relative to bearing block 4 by means of sliding guides such as, for example, alignment jaws 11 of bearing block 5 and bearing block 4. This ensures an exact image without play of the indentations in the bearing block 4 corresponding to the projections 6.

To compensate the material displacement that occurs when projections 6 are pressed into the opposite clamping face 10 of the bearing block 4 without adversely affecting the remaining flat fit of clamping face 7 against the opposite clamping face 10, adjacent rounded grooves 8 are assigned to projections 6. To obtain an advantageous flow of the displaced material, grooves 8 directly merge into the cutting edge flanks 6' and 6".

As shown in FIG. 1, instead of grooves 8 in the bearing cover 5, flat rounded grooves 9 may be arranged in the opposite clamping face 10 of the bearing block 4 in the areas of the projections of bearing cover 5 that are to be pressed in. With respect to their indentation starting from the opposite clamping face 10 these grooves 9 are selected to coincide with the respective edge height H of the projections 6 in order to obtain an adequate depth for material anchoring for the straight and/or curved projections 6. The two types of grooves 8, 9 can also be combined to ensure that there is no material displacement into the areas of the flat clamping face 7 and opposite clamping face 10.

The guided pressing in of projections 6 made possible preferably by the alignment jaws 11, or else by alignment pins, alignment sleeves, or screw centering collars, may be achieved in such a way that the bearing cover 5 with its projections 6 is pressed into the bearing block by means of the screwed connection of the bearing. It is furthermore possible, in the initial mounting of the bearing cover 5, to press said bearing cover 5 into the bearing block by means of a press tool and, where indicated, in case of a partial pre-pressing, to complete the entire pressing process with the screwed connection of the bearing.

The projections 6 on the bearing cover can be produced either by a cutting process or by erosion.

In a further material variant (not depicted) of bearing cover 5, said bearing cover 5 may be made of a sintered material with through-holes for screws. In connection with the sintering process, circular arc projections arranged concentrically to the through-holes and protruding above the clamping face 7 of the bearing cover 5 are formed.

The form-fit connection according to the invention between bearing cover 5 and bearing block 4 made of materials of different hardnesses is preferably used in a machine housing 2 for a V-engine or an internal combustion engine, particularly with a 90° V-angle, in which the transverse loads applied by the engine to the bearing cover 5 are known to be high.

What is claimed is:

1. Split bearing arrangement for a machine housing comprising:

a bearing block and a bearing cover made of materials of different hardnesses, wherein the bearing cover is made of an iron material and is clampably arranged relative to the bearing block and has sharp-edged pointed projections which protrude above a clamping face and which, in an initial mounting of the bearing cover with a particular required force, is capable of being pressed into an opposite clamping face of the bearing block which is made of a light metal, wherein grooves are provided in the clamping face of the bearing cover, wherein the projections of the bearing cover have one of a cutting edge and a pyramid profile, and have (i) an edge angle $\alpha \approx 50°-110°$, (ii) an edge height "H" above the clamping face of the bearing cover which is between 0.25 mm–1.5 mm, and (iii) rounded grooves with radii R=0.15 mm–0.30 mm that are cut within respective radius size, R, into the clamping face so as to adjoin edge flanks of the projections, wherein the grooves are located to receive material of the bearing block that is displaced when the projections of the bearing cover are pressed into the bearing block.

2. Bearing arrangement as claimed in claim 1, wherein the projections on the bearing cover are selected to be straight cutting edges spaced at a distance, A, of between 2 mm–5 mm.

3. Bearing arrangement as claimed in claim 1, wherein the projections on the bearing cover are made as curved cutting edges.

4. Bearing arrangement as claimed in claim 1, wherein the bearing cover which is made of gray cast iron is guided by means of sliding guides relative to the bearing block when the projections are pressed into the opposite clamping face of the bearing block which is made of an aluminum alloy.

5. Bearing arrangement as claimed in claim 1, wherein the bearing cover with its projections is pressed into the bearing block by means of a screwed bearing connection and/or a press tool.

6. Bearing arrangement as claimed in claim 1, wherein flat rounded grooves are arranged in the clamping face of the bearing block in areas where the projections of the bearing cover are pressed in.

7. Bearing arrangement as claimed in claim 1, wherein the bearing cover, which is made of a sinter material and is provided with through-holes for screws, has circular-arc projections that are concentrically arranged relative to the through holes.

8. Bearing arrangement as claimed in claim 1, wherein the projections on the bearing cover are formed by means of one of cutting and erosion.

9. Bearing arrangement as claimed in claim 1, which is used in a machine housing for a V-engine.

10. Split bearing arrangement for a machine housing comprising:

a bearing block having a first hardness and including a first clamping face;

a bearing cover having a second hardness and including a second clamping face and being clampably arranged relative to the bearing block, wherein the second clamping face includes sharp-edged projections formed by edge flanks which protrude beyond the clamping face of the bearing cover, the edge flanks being adjoined by grooves cut into the second clamping face, the projections being pressed into the first clamping face of the bearing block when the bearing cover is clamped to the bearing block with a particular force;

wherein the grooves in the second clamping face of the bearing cover are located to receive material of the bearing block that is displaced when the projections of the bearing cover are pressed into the clamping face of the bearing block.

11. The split bearing arrangement of claim 10, wherein the projections of the second clamping face of the bearing cover have one of a cutting edge and pyramid profile having an edge angle $\alpha \approx 50°-110°$.

12. The split bearing arrangement of claim 10, wherein an edge height, H, of the projections measured from the second clamping face of the bearing cover is between 0.25 mm to 1.5 mm.

13. The split bearing arrangement of claim 10, wherein the grooves of the second clamping face of the bearing cover are rounded grooves with a radius R=0.15 mm–0.30 mm.

14. The split bearing arrangement of claim 10, wherein the bearing cover is made of iron and the bearing cover is made of bearing block is made of light metal.

15. The split bearing arrangement of claim 10, wherein the projections on the bearing cover are selected to be straight cutting edges spaced at a distance, A, of between 2 mm–5 mm.

16. The split bearing arrangement of claim 10, wherein the projections on the bearing cover are made as curved cutting edges.

17. The split bearing arrangement of claim 10, wherein the bearing cover which is made of gray cast iron is guided by means of sliding guides relative to the bearing block when the projections are pressed into the opposite clamping face of the bearing block which is made of an aluminum alloy.

18. The split bearing arrangement of claim 10, wherein the bearing cover with its projections is pressed into the bearing block by means of a screwed bearing connection and/or a press tool.

19. The split bearing arrangement of claim 10, wherein flat rounded grooves are arranged in the first clamping face of the bearing block in areas where the projections of the bearing cover are pressed in.

20. The split bearing arrangement of claim 10, wherein the bearing cover, which is made of a sinter material and is provided with through-holes for screws, has circular-arc projections that are concentrically arranged relative to the through holes.

21. The split bearing arrangement of claim 10, wherein the projections on the,bearing cover are formed by means of cutting or erosion.

22. The split bearing arrangement of claim 10, which is used in a machine housing (2) for a V-engine.

23. A method of making a split bearing arrangement for a machine housing comprising:

providing a bearing block having a first hardness and including a first clamping face;

providing a bearing cover having a second hardness and including a second clamping face, the second clamping face including sharp-edged projections formed by edge flanks which protrude beyond the clamping face of the bearing cover, the edge flanks being adjoined by grooves cut into the second clamping face, clamping the first clamping face of the bearing block to the second clamping face of the bearing cover with a particular force such that the projections of the bearing cover are pressed into the first clamping face of the bearing block and the grooves formed in the second clamping face of the bearing cover operate to receive material of the bearing block which is displaced when the projections of the bearing cover are pressed into the clamping face of the bearing block.

24. The method of claim 23, wherein the projections of the second clamping face of the bearing cover have one of a cutting edge and pyramid profile having an edge angle $\alpha \approx 50°–110°$.

25. The method of claim 23, wherein an edge height, H, of the projections measured from the second clamping face of the bearing cover is between 0.25 mm to 1.5 mm.

26. The method of claim 23, wherein the grooves of the second clamping face of the bearing cover are rounded grooves with a radius R=0.15 mm–0.30 mm.

27. The method of claim 23, wherein the projections on the bearing cover are selected to be straight cutting edges spaced at a distance, A, of between 2 mm–5 mm.

* * * * *

UNITED STATES PATENT AND TRADEMARK OFFICE
CERTIFICATE OF CORRECTION

PATENT NO. : 6,431,759 B1
DATED : August 13, 2002
INVENTOR(S) : Rudolf Wimmer et al.

It is certified that error appears in the above-identified patent and that said Letters Patent is hereby corrected as shown below:

<u>Title page,</u>
Item [75], Inventors, insert the following: -- Andreas Keber, Steyr (AT) --

Signed and Sealed this

Twentieth Day of May, 2003

JAMES E. ROGAN
*Director of the United States Patent and Trademark Office*